Figure 1:
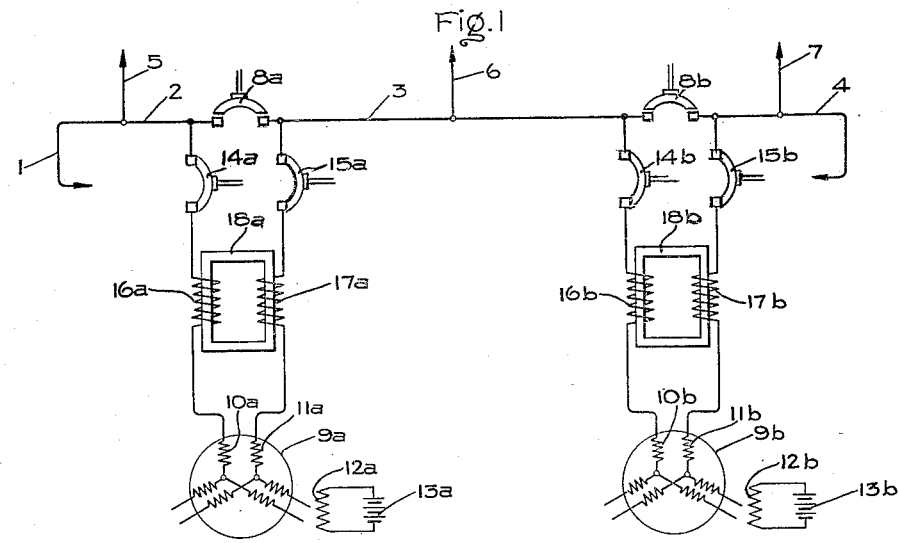

April 5, 1932.  F. W. GAY  1,852,803

SYSTEM OF ELECTRICAL DISTRIBUTION

Filed Oct. 19, 1929

Inventor:
Frazer W. Gay,
by Charles V. Tullar
His Attorney.

Patented Apr. 5, 1932

1,852,803

UNITED STATES PATENT OFFICE

FRAZER W. GAY, OF NEWARK, NEW JERSEY, ASSIGNOR TO GENERAL ELECTRIC COMPANY, A CORPORATION OF NEW YORK

SYSTEM OF ELECTRICAL DISTRIBUTION

Application filed October 19, 1929. Serial No. 401,002.

My invention relates to systems of electrical distribution and more particularly to busbar systems and systems of connections for central generating stations and substations of alternating current distribution systems.

Since the present tendency in power generation is toward larger central stations with larger generating units considerable study during the past few years has been given to the problem of increasing the stability of such systems, and of reducing the value of the normal current that the generator breakers and disconnecting switches are required to carry and the value of short circuit current which the breakers must interrupt. An arrangement which has been found to be very satisfactory in commercial applications for the solution of this problem is described and claimed in United States Letters Patent No. 1,815,823, granted July 21, 1931, upon an application of Theophilus F. Barton, and assigned to the assignee of the present application. In this arrangement each generator is provided with two or more separately insulated windings connected to supply energy to different bus sections so that the power of a single generating unit is not concentrated on a single bus section.

In a system of distribution utilizing multiple-winding generators it is desirable to provide means for decreasing the violence of a short circuit on a given generator winding which happens to be connected nearest the short circuit and at the same time maintain the voltage near the normal value on the busses energized by the other windings of the same generator. Although the well known generator reactor may be connected in series with each generator winding, an undesirable reactive drop is present under normal operating conditions and upon the occasion of a short circuit the voltage of the windings of the same generator not directly connected to the short circuited bus falls so that the voltage on other bus sections may be decreased 35 to 40 per cent under sustained short circuit conditions depending upon the magnitude of the short circuit current.

It is an object of my invention to provide an improved arrangement in electrical systems of distribution and busbar systems of central generating stations and substations for improving the power control and stability of systems of distribution.

Another object of my invention is to provide an improved arrangement for inductively interlinking the different circuits of a multiple-winding generator which are connected to different circuits or different bus sections in a system of distribution so as to reduce the effect of a short circuit on a given winding directly subjected to the short circuit condition and sustain the voltage on the remaining windings of the same machine at substantially the normal operating value.

Figure 2:
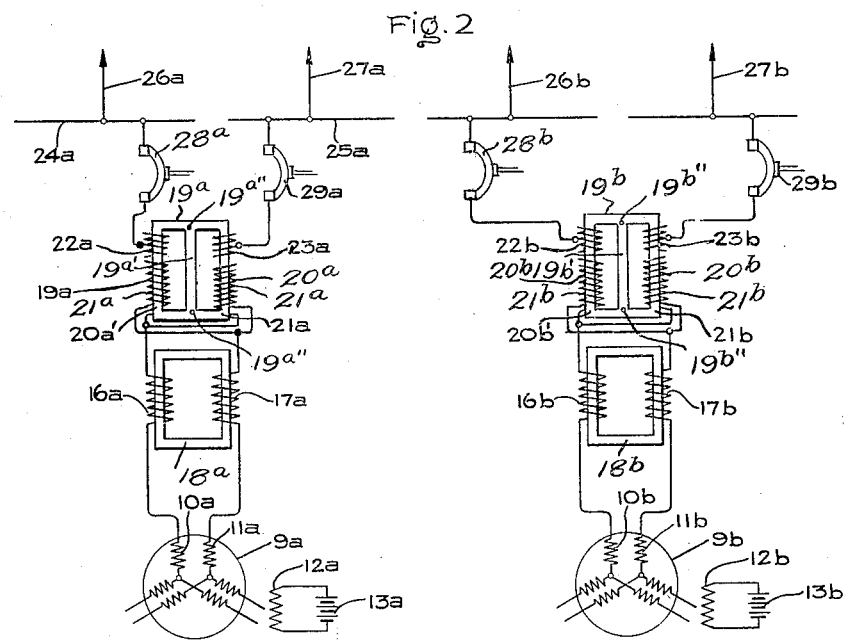

The novel features which I believe to be characteristic of my invention are set forth with particularity in the appended claims, the invention itself however both as to organization and method of operation together with further objects and advantages thereof will be better understood by reference to the following description taken in connection with the accompanying drawings in which Fig. 1 is a diagrammatic illustration of an embodiment of my invention, and Fig. 2 is a modification of the embodiment shown in Fig. 1.

Referring to Fig. 1 of the drawings, 1 indicates a portion of a power station bus which may be of the ring or chain type in a single or duplicate busbar system. For purposes of simplicity a one line diagrammatic representation has been used in this figure as well as in Fig. 2 to illustrate all of the circuits except the armature and field windings of the generators. The bus 1 may comprise any number of sections but for purposes of illustration I have shown only three sections designated as 2, 3 and 4. A large number of feeder circuits may be arranged to be supplied from each bus section and by way of example single feeder circuits 5, 6 and 7 are shown connected respectively to bus sections 2, 3 and 4. The bus sections have interposed therebetween suitable bus sectionalizing switches 8a and 8b which under the usual conditions of operation are maintained in a circuit interrupting position and are moved to a circuit closing position only when it is desirable to connect adjacent bus sections directly together. These switches are shown very diagrammatically and may be of any suitable type, such for example as various types of oil switches well known in the art.

Multiple-winding generators 9a and 9b each having a plurality of separately insulated armature circuits are connected to energize the main bus 1 in such a manner that each separately insulated circuit of the same generator is connected to different bus sections. The alternating current generators are diagrammatically illustrated as double winding generators although it will occur to those skilled in the art that arrangements may be provided for generators having more than two windings without departing from my invention in its broader aspects. As shown, generator 9a comprises two separately insulated stator windings 10a and 11a, and an excitation winding 12a which is energized by a suitable source of current diagrammatically illustrated, as a battery 13a. Similarly the generator 9b comprises two separately insulated stator windings 10b and 11b, and an excitation winding 12b which is connected to a source of current 13b. The windings 10a and 11a of generator 9a are connected to the adjacent bus sections 2 and 3 respectively and the windings 10b and 11b of generator 9b are connected to the adjacent bus sections 3 and 4 respectively. Suitable switches 14a and 15a for example, of the usual type of oil switch, are interposed between bus sections 2 and 3 and the generator windings 10a and 11a, respectively. Similarly, the switches 14b and 15b are interposed in series with the circuits from the generator windings 10b and 11b to the bus sections 3 and 4 respectively. The switches 14a, 15a, 14b and 15b are provided to interrupt the circuit through the generator winding associated therewith upon the occasion of a fault or short circuit, or to isolate a particular generator winding or generator whenever it is found desirable or necessary.

In accordance with my invention, means are provided for inductively coupling the separate circuits of each generator so that in the event of a short circuit or substantial unbalance in current between the circuits of a given machine a high impedance becomes effective in the circuit of the winding traversed by the greatest current and at the same time a voltage component is introduced in the remaining circuits in a direction to sustain the voltage of the circuits not directly connected to the circuit under short circuit or the greatest load. For this purpose I employ differential reactors or balancing transformers comprising a coil 16a connected in series relation with the generator winding 10a and a coil 17a connected in series relation with the generator winding 11a. The coils 16a and 17a are placed in inductive relation and arranged so that for a predetermined division of current and a common power factor between the two generator windings the magnetomotive force of one of the coils will be equal and opposite to the magnetomotive force of the other coil. The coils may be arranged in inductive relation with an air core, or with an iron core 18a as illustrated in the drawings. Similarly, coils 16b and 17b are connected in series relation with the armature windings 10b and 11b, respectively, and arranged on the core 18b. Under balanced load and power factor conditions the impedance drop of the differential reactor may be made very small.

In the event of a short circuit on bus section 3 and with the switch 8a in a circuit interrupting position, the impedance of coil 17a will be very great to the flow of fault current because of the comparatively small counterbalancing magnetomotive force of coil 16a. Furthermore, it will be apparent that while the impedance voltage component across coil 17a is opposed to the voltage generated in winding 11a there is an impedance voltage component across coil 16a which is in a direction to add to the voltage generated in the winding 10a. Thus if the differential reactors are properly designed the voltage of the generator winding connected to the bus section not directly subjected to the short circuit may be maintained at substantially the normal value. It will also be observed that in any case of unbalance in current between the windings of the same generator, the differential reactor will tend to equalize the currents in the two windings. For example, if the load on winding 10a is such that the current traversing 16a is greater than the current traversing 17a the voltage of the bus supplied by 10a will be decreased and the voltage of the bus supplied by 11a will be increased so that the two windings will drop load and pick up load respectively in a manner to equalize the current and power between the two windings.

In case an iron core is used in the differential reactors it is desirable to keep the mutual coupling low between the coils, for example 30 per cent or so, in order that the voltage on the bus section adjacent to the short circuit may not be raised excessively. The voltage boost may also be limited by proper design of the core with regard to saturation. With differential reactors having approximately 30 per cent mutual coupling it is possible to hold an adjacent bus voltage to approximately 100 per cent at the first instant of short circuit. As the armature reaction of the generating unit becomes effective the voltage of the adjacent bus may drop to the neighborhood of 75 per cent of normal voltage. However, if the usual generator reactor of say 10 per cent reactance is used in series with each generator circuit and with no mutual coupling between the reactors the normal bus voltage on the bus section next to the short circuit would drop to approximately 90 per cent at the first instant of the short circuit and then decrease to about 60 per cent under sustained short circuit conditions. Thus it becomes evident that the differential reactor will be advantageous in sustaining the bus voltage to a satisfactory operating value.

In Fig. 2 of the drawings I have shown an embodiment of my invention wherein transformers are interposed between the generator windings and the bus sections instead of the direct connection as shown in Fig. 1. The elements in this embodiment which are the same as shown in Fig. 1 are designated by the same reference numerals for purposes of simplifying the comparison of the two arrangements. In this embodiment a step-up transformer $19a$ comprising separately insulated primary windings $20a$ and $21a$ and secondary windings $22a$ and $23a$ is interposed between the generator windings of $9a$ and the distribution circuits. The high voltage busses are represented by the conductors $24a$ and $25a$ which are connected to energize high voltage feeders $26a$ and $27a$, respectively. Suitable oil switches $28a$ and $29a$ are interposed between the transformer secondary winding $22a$ and $23a$ and the busses $24a$ and $25a$ respectively. The generator $9b$ is connected to the feeders $26b$ and $27b$ through a step-up transformer $19b$ comprising primary windings $20b$ and $21b$, and $22b$ and $23b$, and the switches $28b$ and $29b$. The transformer windings may be arranged in accordance with the arrangement described and claimed in United States Letters Patent No. 1,815,842, granted July 21, 1931, upon my application, and assigned to the assignee of the present application. One arrangement which is suitable comprises the closed core $19a$ having two winding supporting legs $20a'$ and $21a'$. A leakage path $19a'$ in the form of a leg similar to the winding legs is arranged intermediate thereto and provided with openings $19a''$ formed therethrough for the purpose of increasing the reluctance and producing saturation in the leakage path at predetermined unbalanced current value. A portion of the primary winding $20a$ is mounted on the winding leg $20a'$ and the remaining portion is arranged on winding leg $21a'$. Similarly, a portion of the primary winding $21a$ is mounted on the winding leg $20a'$ and another portion on $21a'$. The secondary winding $22a$ is arranged in close inductive relation with the portion of its primary winding $20a$ on the winding leg $20a'$ and in loose inductive relation with its primary winding portion on leg $21a'$. Similarly the secondary winding $23a$ is arranged in close inductive relation with the portion of its primary winding $21a$ on the winding leg $21a'$ and in loose inductive relation with the winding portion of its primary on leg $20a'$. Accordingly, the secondary windings $22a$ and $23a$ of the transformer $19a$ are so arranged with respect to the primary windings $20a$ and $21a$ that the impedance of each of the secondary windings is high with respect to the primary windings when the secondary loads are unbalanced, whereas when the secondary windings are dividing the load uniformly the impedance of all of the secondary windings with respect to the primary windings is low. In the event of an abnormal load being placed upon one of the feeders $26a$ or $27a$, the impedance between the primary winding and the secondary winding associated with the faulty feeder becomes high to the fault current without appreciably affecting the reactance between the primary winding and the remaining secondary winding. The same arrangement is employed in the transformer $19b$.

With the arrangements described the separately insulated feeders will in the usual system of distribution reach substantially every substation so that the load may be distributed uniformly between the different busses thereby minimizing the drop in the differential reactors. There is no difficulty with regard to synchronism between the busses energized from the same generator and in the case of a short circuit on one bus the other busses associated with the same generator are operative at substantially normal voltage due to the action of the transformer and the differential reactors so that synchronism is maintained and greater stability is secured both among the generators in a given station and between stations.

While I have shown and described a particular embodiment of my invention, it will be obvious to those skilled in the art that changes and modifications may be made without departing from my invention and I therefore aim in the appended claims to cover all such changes and modifications as fall within the true spirit and scope of my invention.

What I claim as new and desire to secure by Letters Patent of the United States, is:

1. In combination a dynamo-electric machine having a plurality of separately insulated generating circuits, a plurality of separately insulated distribution circuits each connected to a different generating circuit, and inductive means for interconnecting said generating circuits having a winding in series with each corresponding phase winding of said generating circuits arranged so that for a predetermined distribution of current in said generating circuits the resultant magnetomotive force of said inductive means is substantially zero.

2. In combination, an alternating current dynamo electric machine having two separately insulated circuits, two separate distribution circuits each connected to be energized from a different circuit of said machine, and a reactor for interconnecting said machine circuits having two opposing windings connected respectively in series relation with each corresponding phase winding of said separately insulated circuits.

3. A system of electric distribution comprising a dynamo-electric machine having a plurality of separately insulated generating windings, a plurality of separately insulated distribution circuits each connected to a different generating winding, a plurality of balancing transformers, each transformer being associated with a plurality of generator windings of common phase and having differential windings, each of said differential windings being connected in series with corresponding phase windings of each generator winding, said differential windings being so arranged that the flux in each transformer is substantially zero when there is a predetermined division of current between the windings of each balancing transformer.

4. A system of electric distribution comprising a dynamo-electric machine having two separately insulated generator windings, two distribution circuits each connected to a different generating winding, a balancing transformer associated with corresponding phase windings of each generator winding and comprising two differential windings, said windings being connected in series with corresponding phase windings of each generator winding, said windings being so arranged that the flux in each transformer is substantially zero when the currents in the corresponding phase windings of both of said generator windings is substantially equal.

5. In a system of electric distribution, a dynamo-electric machine having a plurality of separately insulated generator windings, a plurality of distribution circuits each connected to a different generating winding, a differential reactor having a plurality of coils for interconnecting corresponding phases of said generator windings, the coils of said differential reactor being so related inductively that when one of said distribution circuits is subjected to short circuit conditions the voltage boost of the coils associated with the remaining distribution circuits during the first instant of short circuit shall be substantially equal to the voltage decrease of the associated generator windings.

6. In combination, two separately insulated generator windings, two separately insulated busses, a transformer having two separately insulated primary windings and two separately insulated secondary windings, each of said primary windings being connected to a different generator winding and each of said secondary windings being connected to a different bus, said transformer windings being arranged to provide an inductive coupling between said separately insulated generator windings for aiding in maintaining the voltage of generator windings of common phase when subjected to unbalanced current conditions, and additional means for inductively coupling said separately insulated generator windings and their associated transformer windings and arranged to offer a minimum impedance to a predetermined division of current between said windings and a maximum impedance to a flow of current confined principally to one of said windings.

7. In a system of electric distribution, a source of alternating current having a plurality of separately insulated generator windings, a plurality of bus sections, a plurality of distribution circuits each connected to a different bus section, a transformer having a plurality of separately insulated primary and secondary windings, each of said primary windings being connected to a different generator winding and each of said secondary windings being connected to a different bus section, said secondary windings being mechanically spaced and in such inductive relation with respect to said primary windings that the impedance to the flow of energy when uniformly distributed in said distribution circuits is relatively low but when said flow of energy is confined principally to a single secondary winding the impedance is substantially high, a plurality of reactors, each reactor being associated with a plurality of generator windings of common phase and having differential windings, each of said differential windings being connected in series with corresponding phase windings of each generator winding, said differential windings being so arranged that the flux in each reactor is substantially zero when there is a predetermined division of current between the windings of each reactor.

In witness whereof I have hereunto set my hand this 15th day of October, 1929.

FRAZER W. GAY.